June 5, 1951 P. BAIA 2,555,671
TWO-SPEED REWIND DEVICE
Filed Sept. 13, 1948 2 Sheets-Sheet 1
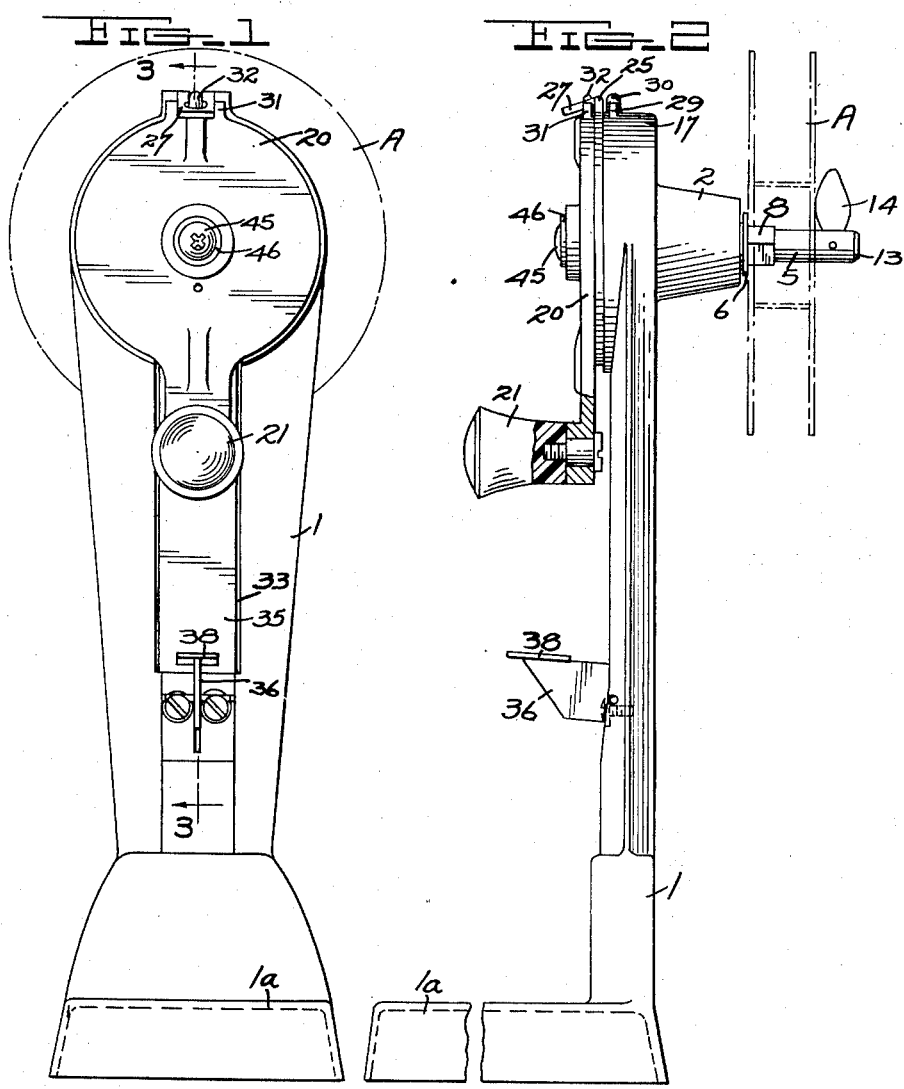
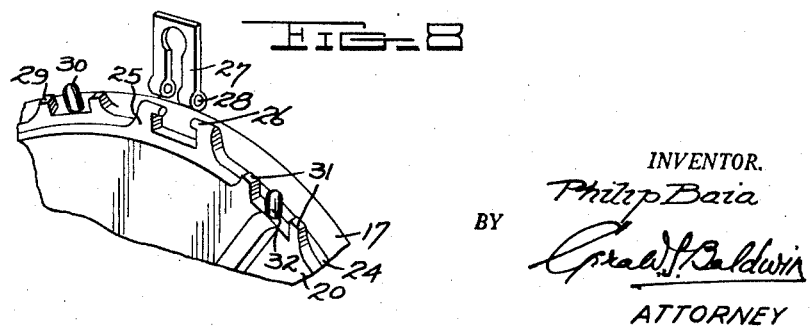
INVENTOR.
Philip Baia
BY
Gerald J. Baldwin
ATTORNEY

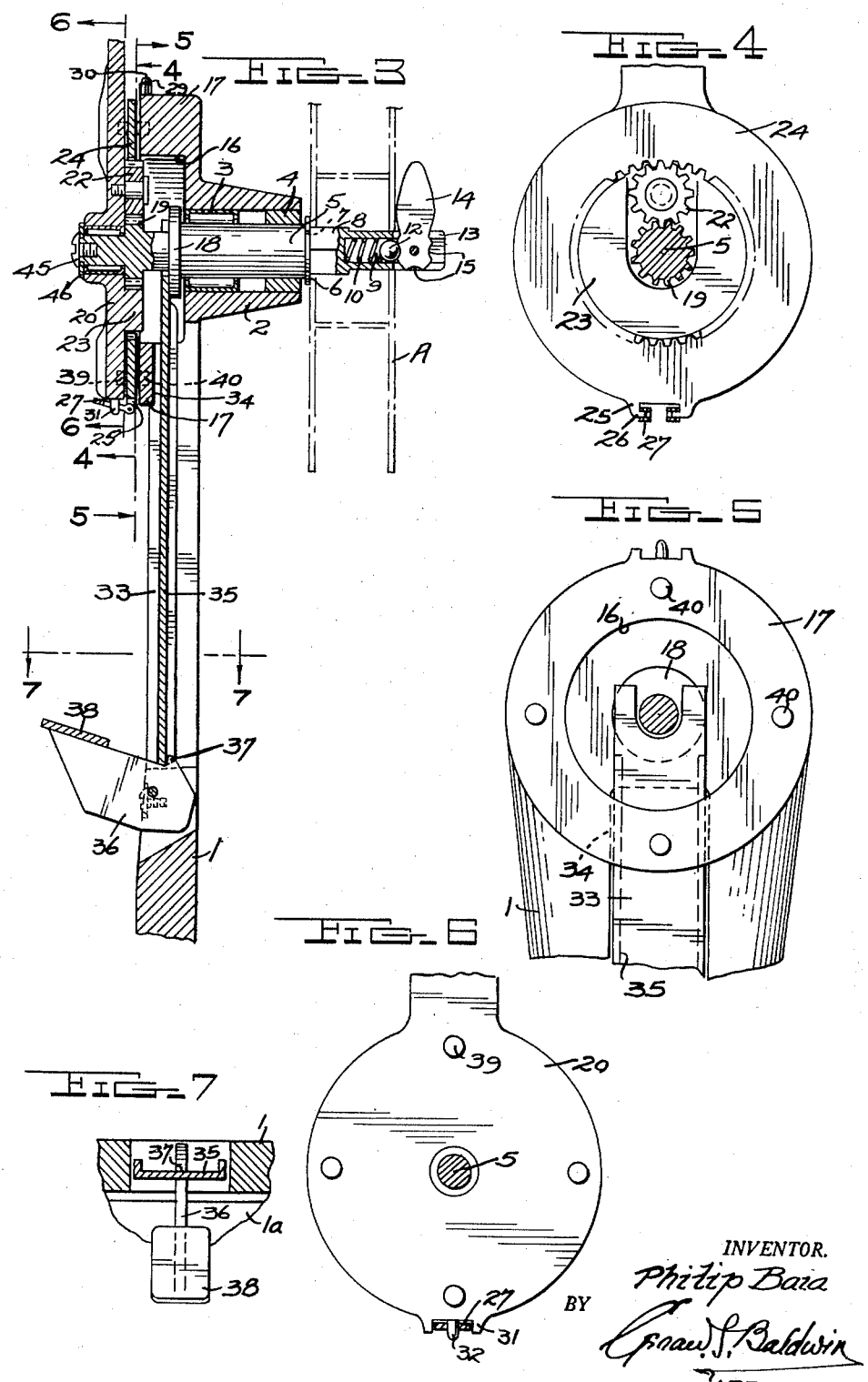

Patented June 5, 1951

2,555,671

UNITED STATES PATENT OFFICE 2,555,671

TWO-SPEED REWIND DEVICE

Philip Baia, Highland Park, Mich.

Application September 13, 1948, Serial No. 49,060

2 Claims. (Cl. 74—785)

This invention relates to improvements in two-speed rewind devices for films. It is customary when checking and editing a film to place the reel having the film thereon on a rewind device positioned on one side of a viewer or editor, and to wind the film through the viewer onto a second reel on another rewind device mounted on the opposite side of the viewer.

It is an object of this invention to provide a two-speed rewind device wherein the slower speed is employed for passing the film through the viewer, and the faster speed is utilized for rewinding the film after inspection.

Another object of the invention is to provide such a rewind device including a simple latch mechanism which, when moved in one direction, results in rotation of the reel at normal film exhibiting speed, and which, when moved in the other direction, results in materially faster rotation on the reel for the same speed of operation of the actuating means.

A further object of the invention is to provide a two-speed rewind device including a braking mechanism which is equally operative for decelerating or halting rotation of the reel irrespective of the speed at which the latter is being turned.

Figure 1 shows a front view of the invention, and

Figure 2 is a side view thereof.

Figure 3 is a section taken substantially on the line 3—3 of Figure 1.

Figures 4, 5, 6 and 7 are sections on the lines 4—4, 5—5, 6—6 and 7—7 respectively of Figure 3.

Figure 8 is a perspective view showing a detail, and with the latch detached from the pintles.

Referring to the drawings, I designates a stand having a suitable supporting base Ia. Projecting from one side of the stand I adjacent its upper extremity is a horizontal bearing 2 having bushings 3 and 4 therein which support a spindle 5 for rotation. A split washer 6 rests against the outer face of the bearing 2 and engages an annular recess 7 formed in the spindle 5 to hold the latter against axial movement in one direction. Outwardly of the washer 6 suitable means are provided on the spindle for supporting a reel A for rotation therewith. Adjacent the recess 7 the spindle 5 is of square section as shown at 8 to engage a correspondingly shaped opening in one side of the reel. The spindle 5 is bored axially from its adjacent extremity as shown at 9 to receive a helical spring 10 one extremity of which rests against the base of the spindle bore 9 and its opposite extremity bears against a ball 12 and urges the latter outwardly. From its outer extremity a slot 13 is formed radially across the bored end 9 of the spindle to receive a keeper 14 which is pivoted therein about an axis extending at right angles to the slot 13. Formed in the edge of the keeper 14 are a plurality of recesses 15 any one of which is adapted to be engaged by the ball 12 so that the keeper is held against accidental pivotal movement. In order to hold the reel A against axial movement on the spindle 5 the keeper may be turned about its pivot axis either to its upward position shown in Figures 2 and 3, or to a position at 180° thereto. To remove the reel the keeper 14 is turned at 90° to the position shown so that it extends parallel with the spindle 5.

Formed in the side of the stand I opposite and coaxial with the bearing 2 is a counterbore 16 surrounded by an annular wall 17. Integral with the spindle 5 adjacent the base of the counterbore 16 is a collar 18, and fixed on the said spindle substantially within the counterbore 16 but spaced from the said collar is a pinion 19. Mounted on the extremity of the spindle 5 remote from the keeper 14 is a rotary plate 20 having an outwardly projecting crank 21 thereon. The plate 20 is freely rotatable on the spindle 5 but is held against axial movement thereon as by a screw 45 in threaded engagement with the adjacent end of the spindle 5. The head of this screw bears against a washer 46 resting against the outer face of the rotary plate 20. Eccentrically mounted for rotation on the inner face of the rotary plate 20 is a pinion 22 which meshes with the pinion 19, and integral with the said plate is an inwardly projecting arcuate guard 23 coaxial with the spindle 5. Mounted for rotation upon the arcuate guide 23 is an internal ring gear 24 which meshes with the pinion 22.

Projecting outwardly from the periphery of the ring gear 24 are two circularly spaced arms 25 from the inner faces of which aligned pintles 26 project. 27 denotes a latch bifurcated at one extremity. Formed in the bifurcations are aligned openings 28 to receive the pintles 26 and thus support the latch 27 for pivotal movement. The bifurcations are so formed that they may be sprung inwardly sufficiently to engage the pintles, and when normally spaced the outer faces of the bifurcations are somewhat inwardly spaced from the opposed faces of the arms 25. Projecting radially outward from the annular wall 17 is a catch 29 which is adapted to receive the latch 27 so that when the crank 21 is turned the ring gear 24 is held stationary and imparts several revolutions to the pinion 19 and spindle 18 through the pinion 22 for each revolution of the said crank. In order to prevent accidental detachment of the latch 27 from the catch 29 between opposite sides of the latter a pin 30 extends radially outward which, as the latch 27 is moved into engagement with the said catch, spreads the bifurcated portions of the latch somewhat and becomes engaged between the latter. Provided on the outer periphery of the rotary plate 20 another catch 31 is provided also to receive the latch 27, and to engage and spread the bifurcations of the latter another pin 32 projects radially outward between the sides of the catch 31. When the latch 27 is moved into engagement with the catch 31 and the pin 32 the ring gear 24 is locked to the rotary plate 20 and consequently when the crank 21 is turned the spindle 5 rotates at the same speed as the plate 20.

Formed centrally and vertically through the stand 1 intermediately of its height is a slot 33 which terminates at its upper extremity in a vertical passage 34 extending through the underside of the annular wall 17. One side of the passage 34 is flush with the base of the counterbore 16 but as the depth of the passage is less than that of the wall the outer face of the latter is uninterrupted around its entire circumference. Mounted in the slot 33 and extending upwardly through the passage 34 is a resilient brake lever 35 the upper extremity of which is bifurcated and extends on both sides of the spindle 5 adjacent the collar 18, and between the latter and the pinion 19. Pivoted on the stand 1 about a horizontal axis extending at right angles to the axis of the spindle 5 is a brake arm 36 on which the underside of the brake lever 35 rests. Projecting upwardly at the rear extremity of the arm 36 is a projection 37 which lies immediately to the rear of the brake lever 35, and mounted on the front extremity of the arm 36 is a step 38. When downward pressure is applied to the latter the projection 37 is moved in a substantially forward direction and forces the lower extremity of the brake lever 35 forward. The front wall of the passage 34 acts substantially as a fulcrum and the upper extremity of the brake lever 35 moves the collar 18 toward the bearing 2 and thus moves the spindle 5 to the right—Figure 3. Cemented or otherwise suitably mounted in recesses formed in the opposed faces of the rotary plate 20 and the annular wall 17, and extending outwardly therefrom, are inserts 39 and 40 respectively, made of plastic or other high friction material. Thus when the rotary plate 20 is moved axially toward the bearing 2 the ring gear 24 is frictionally engaged between the plate 20 and the wall 17 and the rotation of the spindle 5 is retarded. Obviously the retardation or braking action exerted depends upon the amount of pressure applied to the step 38.

While in the foregoing the preferred embodiment of the invention has been described and shown, it is understood that alterations and modifications may be made thereto provided the said alterations and modifications fall within the scope of the appended claims.

What I claim is:

1. A rewind device including a stand, a spindle mounted for rotation thereon, means on one extremity of the spindle for supporting a reel for rotation therewith, a plate rotatable on the opposite extremity of the spindle and held against axial movement thereon, means for turning the plate, a pinion fixed on the spindle, a second pinion rotatably mounted on the inner face of the plate meshing with the first named pinion, a ring gear supported coaxially with the spindle and positioned between the plate and stand, said ring gear meshing with the second pinion, a latch pivoted on the periphery of the ring gear, separate catches on the plate and stand each adapted to be engaged by the latch whereby the ring gear may be secured to the plate for rotation therewith or to the stand to be held immovable thereby, and means for moving the spindle and plate axially, the latter toward the stand, for engaging the ring gear frictionally between said plate and stand to retard rotation of the spindle.

2. A rewind device including a stand having a bearing thereon, a spindle supported for rotation in the bearing, means on one extremity of the spindle to support a reel for rotation therewith, said stand projecting outwardly around the end of the bearing remote from the reel, a plate mounted for rotation on the opposite extremity of the spindle and held against axial movement thereon, said plate being positioned outwardly relative to the stand, a pinion fixed on the spindle between the bearing and the plate, a second pinion rotatably mounted on the inner face of the plate meshing with the first named pinion, a ring gear supported for rotation coaxially with the spindle and meshing with said second pinion, said ring gear being positioned between the plate and stand, manually operable means for locking the ring gear either to the stand or to the plate, a collar fixed on the spindle between the pinion fixed thereon and the bearing, a brake lever having one extremity bifurcated and extending on opposite sides of the spindle and contiguous to the face of the collar adjacent the ring gear, said lever extending substantially radially from the spindle and projecting through an opening formed through the stand, means for moving the outer extremity of the lever so that one side of the latter intermediately of its length rocks on one side of said opening and its bifurcated extremity forces the collar toward the bearing whereby the ring gear is frictionally engaged between the plate and stand to arrest rotation of the spindle.

PHILIP BAIA.

REFERENCES CITED

The following references are of record in the file of this patent:

UNITED STATES PATENTS

| Number | Name | Date |
|---|---|---|
| 144,499 | Betts | Nov. 11, 1873 |
| 1,187,858 | Olson | June 20, 1916 |
| 1,395,067 | Warren | Oct. 25, 1921 |
| 1,986,728 | Hardy | Jan. 1, 1935 |
| 2,150,867 | Voigt | Mar. 14, 1939 |
| 2,226,152 | Babcock | Dec. 24, 1940 |
| 2,392,966 | Baia | Jan. 15, 1946 |
| 2,417,732 | Bland et al. | Mar. 18, 1947 |

FOREIGN PATENTS

| Number | Country | Date |
|---|---|---|
| 267,848 | Germany | Nov. 10, 1911 |